United States Patent [19]

Starker

[11] Patent Number: 4,652,884

[45] Date of Patent: Mar. 24, 1987

[54] SATELLITE NAVIGATIONAL SYSTEM AND METHOD

[75] Inventor: Siegfried Starker, Wessling, Fed. Rep. of Germany

[73] Assignee: Deutsche Forschungs-und Versuchsanstalt fur Luft-und Raumfahrt e.V., Cologne, Fed. Rep. of Germany

[21] Appl. No.: 755,109

[22] Filed: Jul. 15, 1985

[30] Foreign Application Priority Data

Jul. 20, 1984 [DE] Fed. Rep. of Germany ....... 3426851

[51] Int. Cl.$^4$ .......................... H04B 7/185; G01S 5/02
[52] U.S. Cl. ...................................... 342/357; 342/356
[58] Field of Search ............... 343/357, 352, 353, 356, 343/457

[56] References Cited

U.S. PATENT DOCUMENTS

| | | | |
|---|---|---|---|
| 3,209,357 | 9/1965 | Wyatt | 343/357 |
| 3,384,891 | 5/1968 | Anderson | 343/353 |
| 3,471,856 | 10/1969 | Laughlin, Jr. et al. | 343/357 |
| 3,497,807 | 2/1970 | Newton | 343/357 |
| 3,518,674 | 6/1970 | Moorehead et al. | 343/457 |
| 3,544,995 | 12/1970 | Bottenberg et al. | 343/357 |
| 3,789,409 | 1/1974 | Easton | 343/357 |
| 3,848,254 | 11/1974 | Drebinger et al. | 343/457 |
| 4,077,005 | 2/1978 | Bishop | 343/357 |
| 4,161,730 | 7/1979 | Anderson | 343/352 |
| 4,161,734 | 7/1979 | Anderson | 343/352 |

Primary Examiner—Theodore M. Blum
Assistant Examiner—David Cain
Attorney, Agent, or Firm—Collard, Roe & Galgano

[57] ABSTRACT

A system and method for nagivating using satellites for transmitting coded time signals as well as additional data for the purpose of determining position, locating operations, navigation, etc., which includes, transmitting only a time signal consisting of an identification code from a plurality of orbiting navigational satellites directly to users, and distributing any data required for determining position, locating operations and navigation as well as any data on orbiting satellites and ground stations by transmission from a small number of synchronous satellites positioned in geosynchronous orbit, to users. Data from the synchronous satellites may be transmitted to users, together with a time signal, at precisely the same frequency at which the navigational satellites emit their time signals.

18 Claims, 5 Drawing Figures

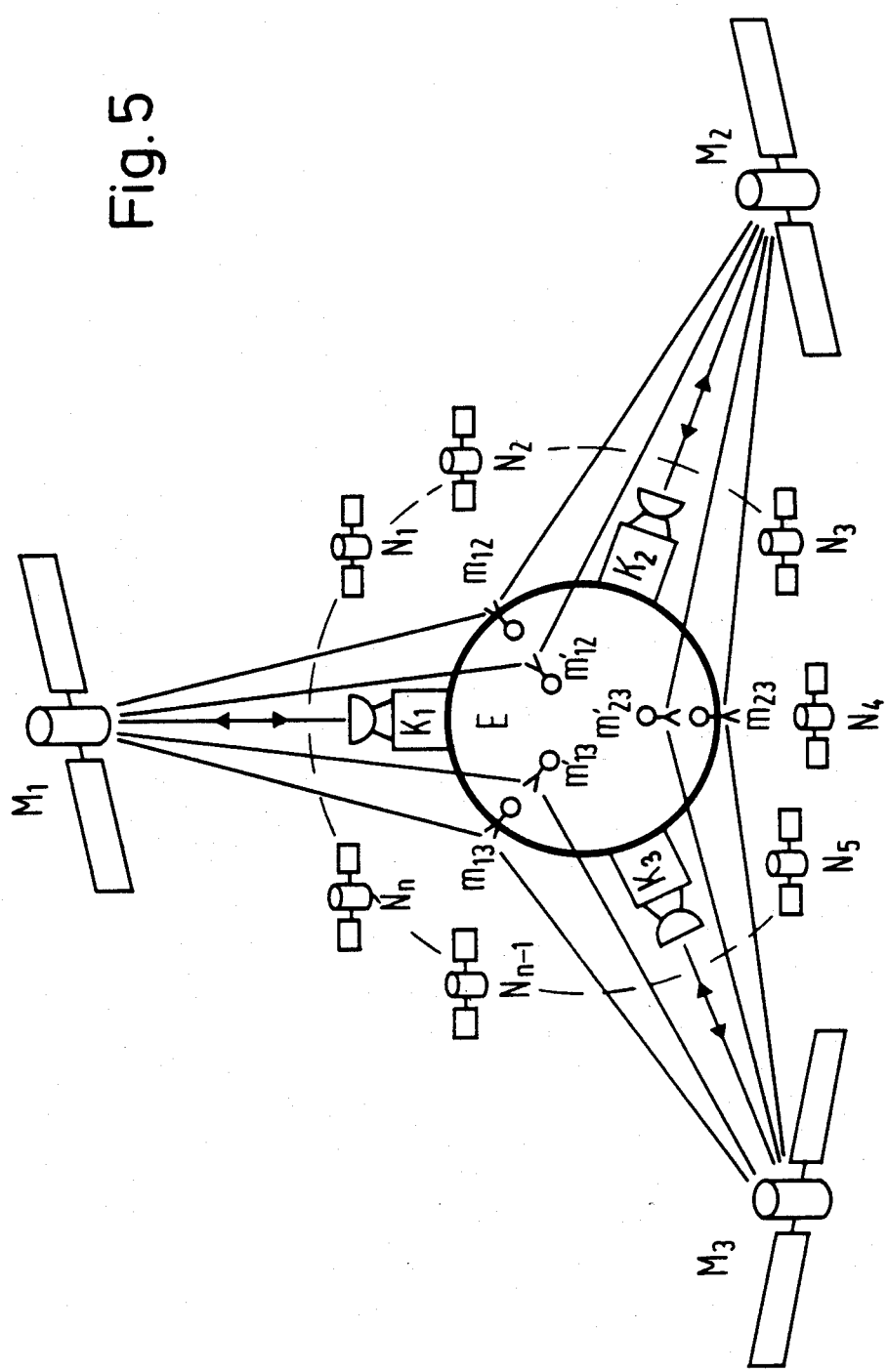

SATELLITE NAVIGATIONAL SYSTEM AND METHOD

BACKGROUND OF THE INVENTION

The invention relates to a satellite navigational system and method. More particularly, it relates to a navigational system and method using satellites for transmitting coded time signals as well as additional navigational data used for determining position, locating operations, navigation, etc.

In the navigation of vehicles, proper position and speed must be determined within a given reference system. The reference points conventionally used are radio beacons in a precisely known, fixed position. With the increasing accuracy in the determination of satellite positions, the use of satellites as reference points for high-precision locating and navigating operations has become possible. The use of satellites brings about substantial advantages. Due to the higher frequencies involved, measuring accuracy is enhanced. Longer reaching and more economical systems may be developed as satellite coverage becomes available over large areas on the earth's surface. The three-dimensional reference points provided by satellites permit three-dimensional and, thus, more precise fixing of vehicle positions, satisfying most of the user's requirements.

However, as compared to terrestrial radio beacons, the use of satellites requires additional expenditures as the positions of satellites are subject to constant change, and operation as well as synchronization of the high-stability time signal transmitters within these satellites requires specific techniques. Thus, any receiver of ranging signals from a satellite must be continuously supplied with other information as well, i.e., data on the position of the respective satellite and on the exact reading of the satellite clock at the time of transmission of the signals, so as to be able to determine its proper position from the signals received.

At present, irrespective of other existing navigational systems, satellites positioned in geosynchronous orbit above the equator of the earth are being used for establishing communication between cruising ships and control stations on the shore. For the transmission of distress signals, experiments are being conducted with satellites either orbiting across the polar regions or positioned in geosynchronous orbit above the equator. Also proposed was the distribution of information under simultaneous interrogation of vehicle positions by means of geostationary satellites.

Satellite navigation in the specific sense means determining the proper position and, if necessary, the proper movements of a vehicle with the aid of satellites. As in terrestrial radio locating systems, proper position is determined by the propagation time and/or change in propagation time of electromagnetic waves between the vehicle and a number of reference points. Two or three-dimensional position fixing requires measuring operations involving from two to four reference points depending on whether the single-way or two-way method is used. For high measuring accuracy, these reference points must also be in a favorable geometrical position relative to the cruising vehicle. As such, favorable geometrical groupings covering the entire surface of the earth cannot satisfactorily be realized using satellites in geosynchronous orbit. A navigational satellite system extending around the earth always includes orbiting satellites in a non-geosynchronous position, with their orbital paths at a lower plane than those of geosynchronous satellites.

The best known and hitherto only operational navigational satellite system of this type is the so-called TRANSIT system. In this system, each space segment includes five satellites positioned in polar orbits transmitting time signals on two different frequencies, together with data on their respective orbits. Slow moving vehicles may determine their positions at larger time intervals by measuring and utilizing, respectively, the Doppler effect during each transit recurring at intervals of from two to ten hours. However, to have a sufficient number of satellites available for position fixing at any time at each location on the earth's surface, a plurality of satellites must continuously circle the earth at varying planes of orbit (three-dimensional single-way position fixing requires e.g., four simultaneously visible satellites). A system presently being set up in the United States of America, the so-called NAVSTAR-GPS (Global Positioning System), which will be put in operation in 1987 or 1988, was to comprise twenty-four of such navigational satellites; to save costs, the number of satellites was recently reduced to eighteen. The alternative European systems NAVSAT and GRANAS now in the planning stage will require about the same number of navigational satellites. However, the intent is to lower the total expenses for the two European systems below those of the U.S. system by spending less for the individual satellites and tolerating somewhat higher expenditures for the ground equipment. Thus, the navigational satellites proposed for both European systems are not to include the high-stability oscillators which are a major factor in the cost of the U.S. navigational system NAVSTAR-GPS.

The synchronized time signals required for single-way ranging operations shall instead be produced on the ground, together with the above-mentioned additional data. They will be transmitted from a plurality of ground stations distributed over the earth to the navigational satellites and retransmitted from there to the cruising vehicles. Installation and operation of these extensive and complex ground stations will, however, consume a large part of what has been saved in the equipment of the satellites. Not even the proposed modification of the European GRANAS system will noticeably reduce the total costs of the system. The intended simplification of the ground stations through proper position fixing within the satellites will again bring about somewhat higher expenditure for the satellites. Of the other navigational satellite system, GLONAS, presently being installed in the Soviet Union, it is known only that it has a strong resemblance to the U.S. system NAVSTAR-GPS.

All presently existing or planned navigational systems using satellites utilize a plurality of similarly designed, orbiting satellites which emit locating signals, in the form of time marks, as well as additional, satellite specific information, i.e., data required for reading and utilizing these time signals in position fixing and navigational operations. This data is corrected at certain intervals by the ground control equipment and subsequently retransmitted to the satellites for storage. Also included is data for contacting other navigational satellites and conducting propagation corrections, or retransmission of the locating signal on a second carrier frequency. Moreover, all previously disclosed or proposed systems are limited to the determination of proper position and speed of vehicles. The various systems are incompatible with each other and a user must have available a variety of equipment if he wants to receive signals from the navigational satellites of the various systems. Thus, because of the high expenditure required for each satellite serving the above functions, the costs of an international, global system are very high as 18 to 24 of such satellites are needed for an adequate global coverage.

SUMMARY OF THE INVENTION

Accordingly, it is the object of the present invention to provide a satellite navigational system and method which is less expensive and, in particular, brings about a considerable reduction in the costs of navigational satellites. It is also an object of the present invention to provide a navigational system and method using satellites which is capable of transmitting additional data such as up-to-date warnings and distress signals, and establishing communication or even cooperation with other types of navigational systems.

Certain of the foregoing and related objects are readily attained in a navigational system and method using satellites for transmitting coded time signals as well as additional navigational data for the purpose of determining position, locating operations, navigation and the like. A plurality of orbiting satellites, the so-called navigational satellites, or ground stations, emit only a time signal comprising an identification code. Any information data required for determining positions, locating operations and navigation as well as any data on orbiting navigational satellites and ground stations are distributed by means of a small number of satellites positioned in geosynchronous or quasi-geosynchronous orbit, the so-called synchronous satellites. Data from the synchronous satellites may be transmitted together with a time signal at precisely the same frequency, at which the navigational satellites emit their time signals.

Preferably, a reference in time is established between the various satellite signals by having each of the synchronous satellites emit its time code signal on two different frequencies, the first frequency serving to transmit the time signal to the user and the second frequency serving to transfer the time signal to the simple navigational satellites. Most desirably, the simple navigational satellites transmit the time signal only on a single carrier frequency, and corrections required because of ionospheric influences or disturbances are made by utilizing the signals transmitted by the synchronous satellites on the two different frequencies.

Some of the navigational satellites may retransmit data and additional information received from one of the synchronous satellites so as to supply particular regions, e.g., the polar regions.

In a preferred embodiment, cooperation with orbiting beacon satellites of other navigational systems is established by proper synchronization of the first frequency and the various time code signals.

If desired, all functions of the plurality of navigational satellites may also be served by ground stations controlled in a similar manner by one of the synchronous satellites. For automatic monitoring, individual vehicles may be sequentially interrogated with the aid of information data transmitted together with the navigational signal from one of the ground control stations via one of the synchronous satellites so as to induce the vehicles to send out their positions and identification codes on a further carrier frequency.

It is also desirable that the time signal transmitted by one of the synchronous satellites be used by cruising vehicles for automatically maintaining communication, by determining the direction of the incoming signal by position fixing methods and focusing the antenna of the communication equipment in the vehicle in alignment to trace the respective synchronous satellite on the basis of the measured directional data.

A global navigational system according to the invention includes at least three satellites in geosynchronous or quasi-geosynchronous orbit as well as associated ground control stations capable of being regionally operated. A plurality of orbiting satellites are jointly used by the various subsystems consisting of a synchronous satellite and the ground control equipment associated therewith.

With the navigational system of the invention, the functions of the unavoidably large number of orbiting navigational satellites may be reduced to a far greater extent than with the planned U.S. or European systems such as NAVSTAR or GRANAS. Only that function which is absolutely necessary, i.e., the transmission of a time signal is left with the satellites. With the system of the invention, it will be sufficient to distribute orbital data of all satellites, together with the mentioned additional data, to the various users via a single satellite which is conveniently positioned in geosynchronous or quasi-geosynchronous orbit so as to remain within the visual range of some ground control station either permanently or at least over very long periods of time.

If such a synchronous satellite sends out a time signal together with the mentioned additional data which, transmitted on a first carrier frequency $(f_1)$, is received by the user and, transmitted on a second carrier frequency $(f_2)$, synchronizes the signals of the navigational satellites, the simple basic arrangement described above not only permits accurate position fixing within the range simultaneously covered by neighboring synchronous satellites but serves other functions as well which are described below.

As only part of the earth's surface may be reached by a single satellite in geosynchronous or quasi-geosynchronous orbit, a global navigational system according to the invention must comprise at least three synchronous satellites to supply information to all parts of the earth.

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

BRIEF DESCRIPTION OF THE DRAWINGS

In the drawings, wherein similar reference characters denote similar elements throughout the several views:

FIG. 5 is a schematical diagram of a system according to the invention which covers the entire surface of the earth and includes at least three synchronous satellites as well as the ground control station and receiving monitor stations associated therewith.

DETAILED DESCRIPTION OF THE PREFERRED EMBODIMENTS

Figure 1:
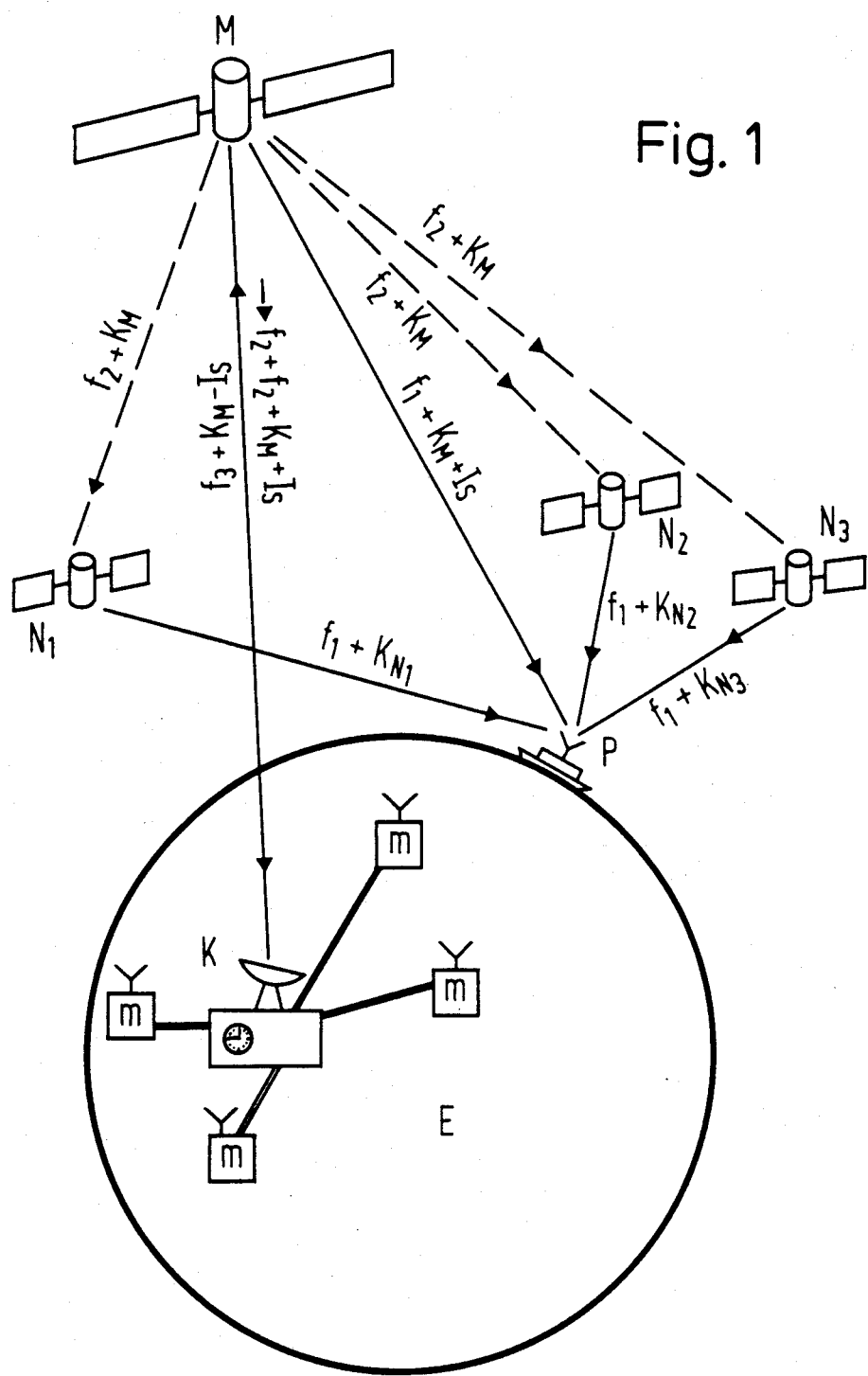
FIG. 1 is a schematical diagram of the most important functions of the system according to the invention when determining the position of a user.

Referring now in detail to the drawings, shown in FIG. 1 are the most important functions of the navigational satellite system of the invention during position fixing of user P. Depicted in FIG. 1 are a satellite in geosynchronous or quasi-geosynchronous orbit, i.e., so-called synchronous satellite M, as well as the orbiting simple satellites, i.e., so-called navigational satellites $N_1$ to $N_3$. User P, here represented as a cruising ship, is located on the surface E of the earth which is indicated by the circular area. Also located on surface E are a ground control station K and the monitor stations m associated therewith. The various connections between synchronous satellite M, navigational satellites $N_1$ to $N_3$, user P and ground control station K are shown as solid or dotted lines and include designators indicating frequency and data type.

On frequency $f_1$, user P receives time signals from navigational satellites $N_1$ to $N_3$ and synchronous satellite M; the signals are distinguishable by codes in orthogonal relationship to each other, the respective codes being specified at the various "connecting lines". Signals arriving from synchronous satellite M also include any data $I_s$ required for position fixing and further navigation. Data $I_s$ originates at ground control station K from where it is continuously transmitted to synchronous satellite M on a further frequency $f_3$. A time signal comprising code signal $K_M$ is simultaneously transmitted on frequency $f_3$ to synchronous satellite M, serving as a reference between the time of the clock in ground control station K and the time of synchronous satellite M.

If navigational satellites $N_1$ to $N_3$ produce the time signal to be transmitted by means of a stable oscillator accommodated in each of these satellites, the stability of such satellite oscillators may be lower by about one order of magnitude in the system of the invention than, e.g., in the planned U.S. navigational system NAVSTAR-GPS. This is due to the fact that in the present invention the parameters of satellites and clocks may be corrected and brought up-to-date at far more frequent intervals, whereas in the NAVSTAR-GPS system, a 24-hour rhythm must generally be observed for such corrections. In principle, however, the navigational satellites of other systems may also be used in the system of the invention, provided frequency $f_1$ serving as a carrier frequency and time code signals $K_{Ni}$ (i=1, 2, 3, ..., n) are adapted to each other.

In the navigational system of the invention, the so-called clock oscillators in the various navigational satellites $N_1$ to $N_3$ may be omitted. The time signals of the navigational satellites may be controlled through synchronous satellite M by transmitting time code signals $K_M$ on a transmitting frequency $f_2$. In this case, a regenerative transponder in the respective navigational satellite $N_i$ (i = 1, 2, 3, ..., n−1, n) merely has to provide for a simultaneous start of received code signal $K_M$ and transmitted code signal $K_N$. By the information supplied by data $I_s$, any user P is aware at any given time of the exact position of each navigational satellite $N_i$ and may thus calculate the delay in time between transmission of code signal $K_{Ni}$ by satellite $N_i$ and transmission of code signal $K_M$ by synchronous satellite M. By properly correcting the measured single-way propagation time, user P obtains a series of measuring data that may be read and treated in the same manner as the measuring data obtained from four satellites comprising accurately synchronized clocks.

In contrast to prior systems either in operation or in the planning stage, synchronous satellite M need not be equipped with a high-stability oscillator if the time signals arriving at synchronous satellite M from ground control station K are directly used for controlling the time cycles of the navigational satellites $N_i$. In this simple manner, one may secure the coherence in time of all navigational signals within the range of a ground control station K and a synchronous satellite M, respectively, so that the problems hitherto encountered in connection with satellite clocks no longer exist.

Figure 2:
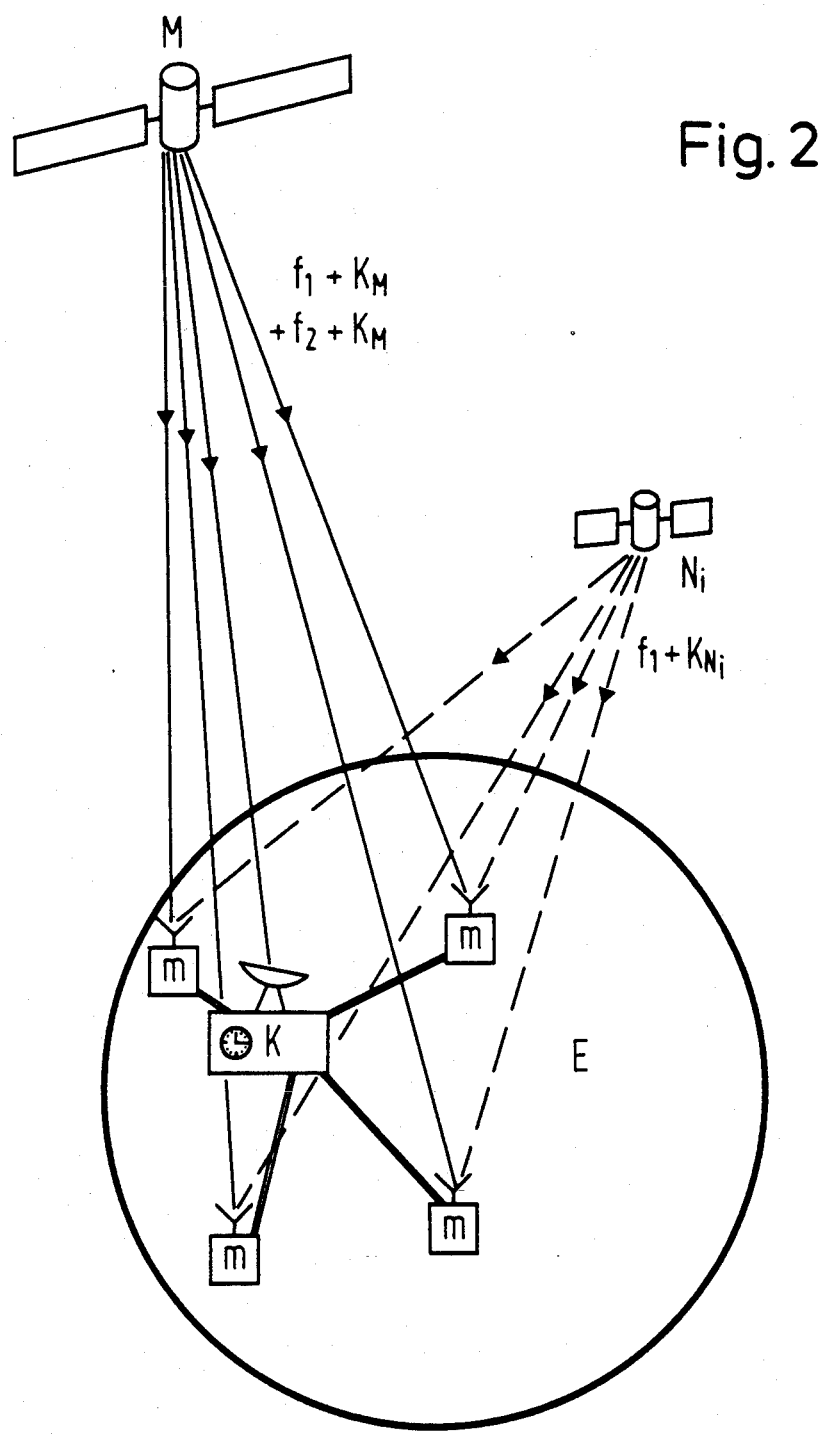
FIG. 2 is a schematical diagram of the single-way measuring method for determining the orbital path of a satellite and comparing the clocks within the satellites with a clock on the ground, with only a single carrier frequency being used by the simplified navigational satellites.

Monitoring of the orbital paths of synchronous satellite M and navigational satellites $N_i$ as well as comparative checks between satellite clocks and the clock in a ground control station are conveniently conducted in accordance with the conventional single-way ranging method as illustrated in FIG. 2. Four synchronized receiving monitor stations m determine the arrival time of time signals from the various satellites, namely synchronous satellite M and navigational satellites $N_i$, as compared to a ground reference time. The measuring results are then transmitted to ground control station K for computation of the orbital paths of the satellites and eventual deviations of the satellite times.

To permit measuring and correction of ionospheric influence, each orbiting navigational satellite of the prior systems has to emit time signals at two different frequencies. In the navigational system of the invention, it is sufficient that the navigational satellites emit their time signals on a single frequency $f_1$ since ionospheric disturbances may be determined at any give time with the aid of the time signals emitted on two frequencies by synchronous satellite M. If required, users may directly obtain this information by receiving frequency $f_2$. However, it will generally be sufficient and more economical, too, for users to conduct necessary propagation correction with the aid of the data constantly accumulating in monitor stations m and ground control stations K and continuously transmitted to the user together with data $I_s$ (see FIG. 1).

Due to the introduction of synchronous satellite M, the various navigational satellites $N_i$ need only transmit on a single frequency, and users need only receive this specific frequency. Nevertheless, it is possible to conduct propagation corrections in accordance with the conventional two-frequency method.

In the navigational system of the invention, any function of the various navigational satellites $N_i$ may be taken over by some ground control station. Of special interest in this context are ground stations equipped with regenerative transponders which merely transpose the time signal received from a synchronous satellite M with respect to frequency and code before it is retransmitted. As the position of each ground station remains constant within a coordinate system on the earth, it is neither necessary nor useful to continuously transmit the respective position via satellite. For that reason, position and identification code of each ground transponder $T_i$ are suitably modulated upon the time signal of the respective transponder in the usual manner.

Figure 3:
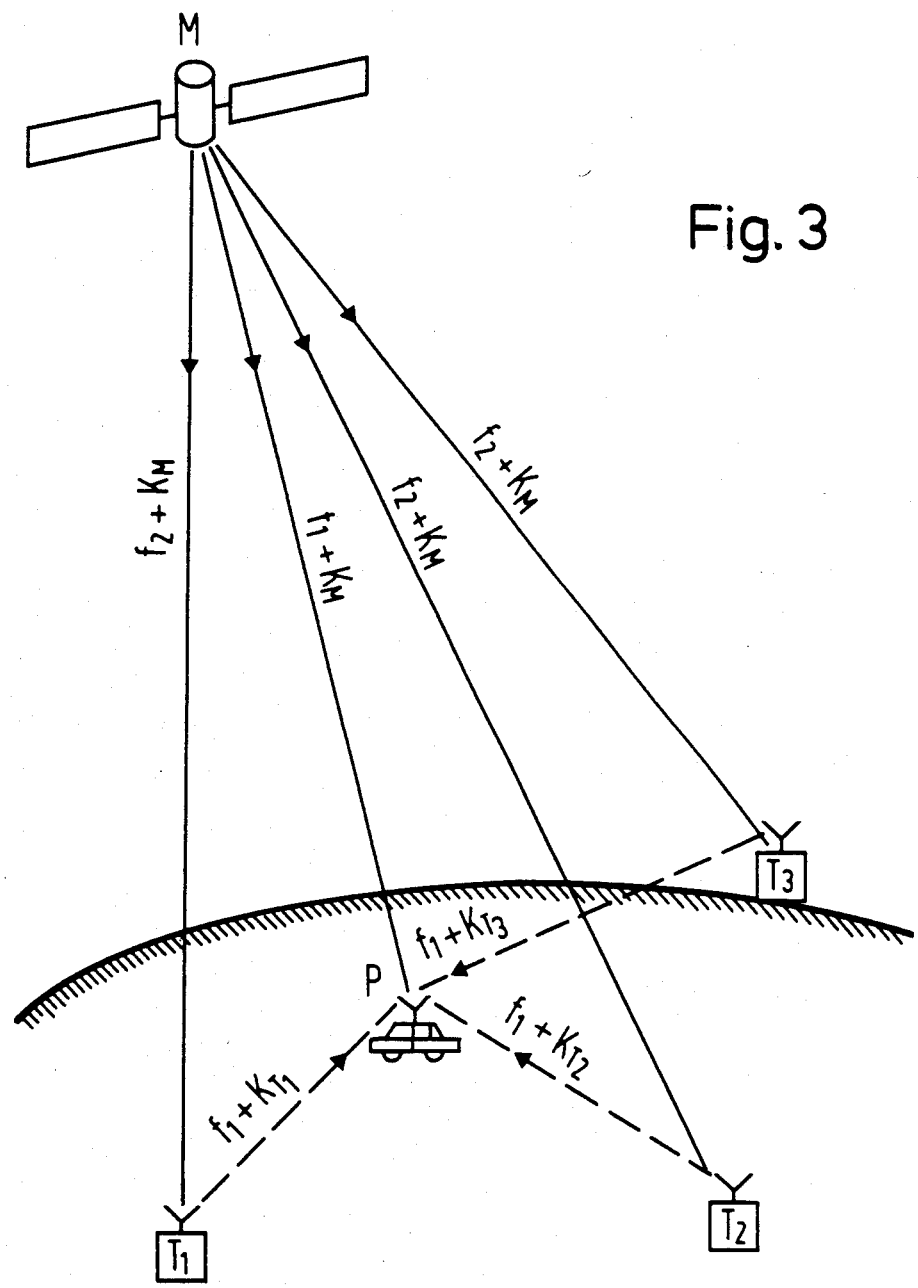
FIG. 3 is a schematical diagram of proper position fixing by a user with the aid of the system according to the invention, the simple navigational satellites being replaced by a ground transponder station.
Figure 4:
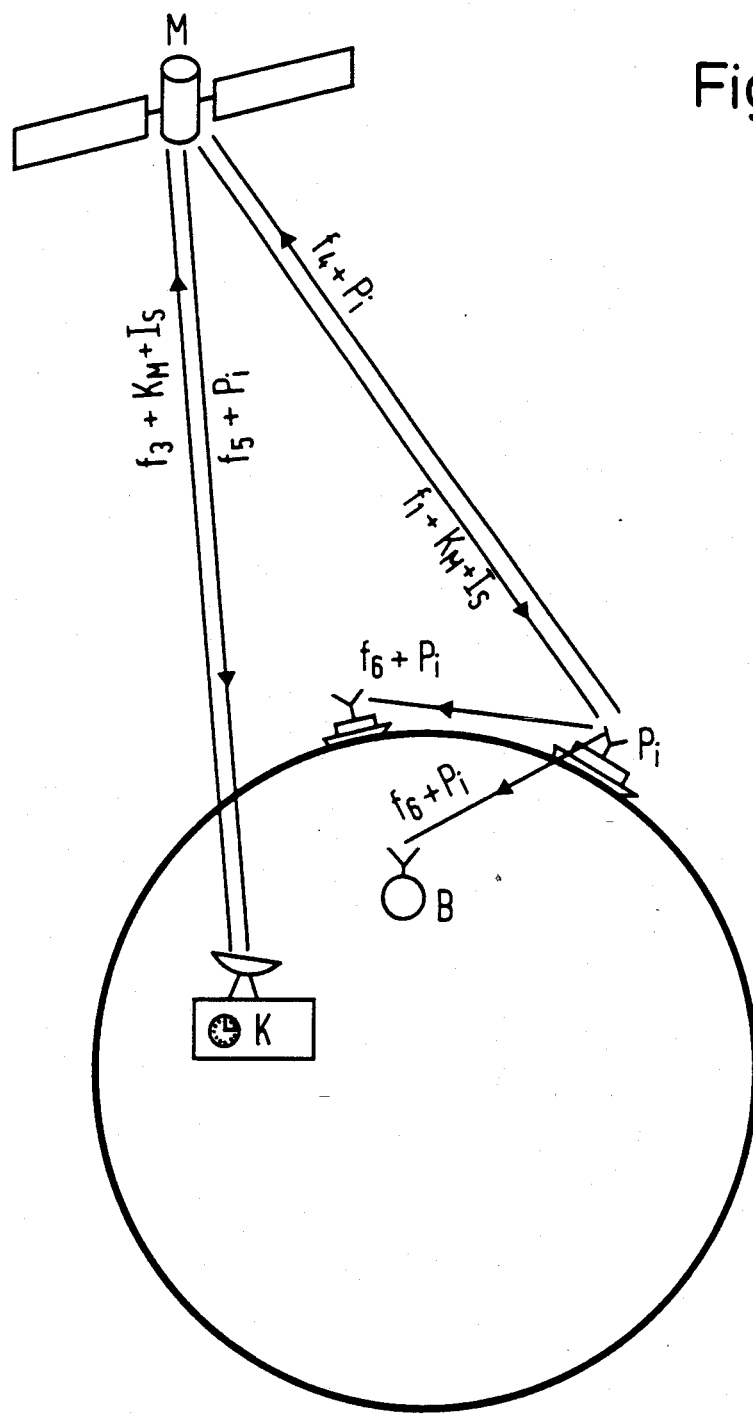
FIG. 4 is a schematical diagram of monitoring and transmission of distress signal with the aid of the system according to the invention.

FIG. 3 illustrates how user P may determine his own position with the aid of synchronous satellite M. In the case illustrated, user P determines the proper position coordinates by receiving signals from three ground transponders $T_1$ to $T_3$, namely $f_1+K_{T1}$, $f_1+K_{T2}$ and $f_1+K_{T3}$, as well as signal $f_1+K_M$ from synchronous satellite M. When requiring or desiring only two-dimensional fixing of the position, user P need only receive the signals from the three ground transponders $T_1$ to $T_3$. In this case, however, at least one of transponders $T_1$ to $T_3$ must also transmit data $I_s$ as received from synchronous satellite M.

Such ground transponder stations $T_i$ are of interest where accurate navigation relative to existing fixed reference points is required within a relatively small area, e.g., for airplanes in the vicinity of airports, for ships in ports or coastal waters, and for land vehicles. The special advantages of such ground transponder stations $T_i$ reside in the availability of higher transmitting power, the reduced distance between transmitter, i.e., ground transponder $T_i$, and user P; the practical non-existence of ionospheric influences if transponder stations $T_i$ are not too far removed from each other; and in the fact that a permanent, optimized geometrical arrangement of fixed reference points may thus be provided in certain areas.

Other uses not offered by presently existing or planned navigational systems using satellites are monitoring operations and transmission of distress signals. Monitoring may be effected by a ground control station by transmitting interrogation signals at predetermined intervals to the vehicles to be monitored, causing those vehicles to transmit their positions together with their respective identification codes. Automatic transmission of position and identification code is particularly convenient. Vehicle interrogation requires relatively few address bits within data $I_s$ transmitted by ground control station K. Thus, the monitored vehicles are induced to sequentially transmit their respective positions at time intervals to be determined by ground control station K. Receivers of the position data transmitted by the individual vehicles may be other vehicles in the vicinity, neighboring monitor stations B, and especially ground control station K which receives position data and identification code through a detour via synchronous satellite M where the data are transposed and transmitted on a further carrier frequency, e.g., $f_5$. The same channel of communication may be used for transmitting distress signals to ground control station K.

Besides the above discussed narrow-band transmission of information which may be effected with the so-called spread-spectrum technique and with the low-focused antennae of vehicles, there is frequently required a broad-band transmission path between users P, i.e., the vehicles, and ground control station K. For this purpose, a more highly focused antenna on each user vehicle P must be aligned with the so-called communication satellite, tracing that satellite accurately and without interruption while the vehicle moves about. This problem too may be solved with the aid of the navigational signal emitted by synchronous satellite M, in that the direction of the incoming signal is determined and used as a reference for automatic alignment of the antenna. Automatic alignment of the so-called communication antenna is particularly easy if the synchronous satellite also serves as a communication satellite. However, the additional expenditure is not very high if some other satellite in geosynchronous orbit, the approximate position of which in relation to synchronous satellite M is known, is chosen as a communication satellite.

All above described functions of the navigational system of the invention are limited to that area on the surface of the earth that may be covered by a single synchronous satellite M. For complete coverage of the earth's surface E, there are required at least three synchronous satellites M as well as ground control stations $K_i$ and receiving monitor stations $m_{ij}$ associated therewith. FIG. 5 shows three synchronous satellites $M_1$ to $M_3$, a plurality of orbiting navigational satellites $N_1$ to $N_3$ as well as three control stations $K_1$ to $K_3$ and a number of receiving monitor stations $m_{1,2}$ to $m'_{2,3}$ distributed over the earth's surface. Monitor stations $m_{1,2}$, $m'_{1,2}$; $m_{1,3}$, $m'_{1,3}$; $m_{2,3}$, $m'_{2,3}$ are suitably in locations where they may receive signals from two synchronous satellites each, namely $M_1$, $M_2$; $M_1$, $M_3$ and $M_2$, $M_3$, respectively, to retransmit the measuring data thus received to ground control stations $K_1$ to $K_3$. This guarantees optimum interconnection of the various subsystems. For reasons of redundancy and proper transmission of information from one subsystem to the next, i.e., from one ground control station $K_i$ and the associated receiving monitor stations $m_{ij}$ to the next, it is advisable to select a number of more than three synchronous satellites $M_i$ and, if possible, have each ground control station $K_i$ covered by two synchronous satellites $M_i$.

Synchronous satellites which are stationary above some precise point of the equator may cover only the regions up to about 80° of northern and southern latitude. If the navigational system of the invention shall also supply information to the polar regions, one may either equip some of the navigational satellites $N_i$ orbiting on a polar route, i.e., on a path crossing the poles of the earth, with specific transponders for retransmitting informational data $I_s$ received from synchronous satellites, or the synchronous satellites $M_i$ must follow an orbital path that is inclined with respect to the equator. In the last mentioned case, synchronous satellites $M_i$ will at times travel over the northern hemisphere and at other times over the southern hemisphere, moving in varying patterns relative to a fixed point on the earth's surface. These orbits are referred to as quasi-geosynchronous orbits. They have been comprehensively described in prior literature and may still be further optimized with a view to complete coverage of the polar regions.

While only several embodiments of the present invention have been shown and described, it is obvious that many changes and modifications may be made thereunto, without departing from the spirit and scope of the invention.

What is claimed is:

1. A method for navigating using satellites for transmitting coded time signals as well as additional data which comprises the steps of:

transmitting only a time signal comprising an identification code from a plurality of orbiting navigational satellites to an intended user;

transmitting navigational data together with a time signal from a plurality of synchronous satellites positioned in geosynchronous orbit, to said user and using additional ground transponder stations for retransmitting the signals of synchronous satellites.

2. The method according to claim 1, wherein data from said synchronous satellites is transmitted to said user together with a time signal at precisely the same frequency at which said navigational satellites transmit their time signals.

3. The method according to claim 1, additionally including the step of establishing a reference in time between the navigational satellite time signals and the synchronous satellite time signals by having each of said synchronous satellites transmit its time code signal on two different frequencies, a first frequency serving to transmit said time signal to said user and a second frequency serving to transmit said time signal to said navigational satellites.

4. The method according to claim 3, wherein said time signal is transmitted from said navigational satellites to said user only on a single frequency, and wherein said method additionally includes the step of making corrections required because of ionospheric influences by utilizing the signals transmitted by said synchronous satellites on said two different frequencies.

5. The method according to claim 1, wherein at least one of said navigational satellites retransmits data and additional information received from one of said synchronous satellites to a certain region on the earth.

6. The method according to claim 1, wherein said certain region is a polar region.

7. The method according to claim 1, additionally including the step of establishing cooperation with orbiting beacon satellites of other navigational systems by proper choice of the navigational satellite frequency and by synchronization of the time code signals transmitted by said navigational satellites.

8. The method according to claim 1, wherein the time signal transmitted by one of said synchronous satellites is used by a cruising vehicle for automatically maintaining communication in that the direction of the incoming signal is determined by tracking methods and a focused antenna of the communication equipment in said vehicle is aligned to trace the respective synchronous satellite on the basis of the measured directional data.

9. The method according to claim 1, wherein navigational data, as well as any data on orbiting satellites and ground stations is transmitted from a small number of quasi-geosynchronous satellites to users.

10. The method according to claim 1, additionally including the step of sequentially interrogating individual user vehicles with the aid of data transmitted together with the navigational signal from one of said ground control stations via one of said synchronous satellites so as to prompt said vehicles to send out their positions and identification codes on a different carrier frequency, thereby effecting automatic monitoring.

11. The system according to claim 1, wherein at least one of said navigational satellites includes means for retransmitting data and additional information received from one of said synchronous satellites to a certain region on the earth.

12. The system according to claim 1, wherein said navigational satellites additionally include means for properly synchronizing the navigational satellite frequency and time code signals with those of orbiting beacon satellites.

13. The system according to claim 1, additionally including a user vehicle comprising:
means for determining the direction of an incoming time signal from a synchronous satellite by tracking methods; and
means for directing a focused antenna to trace and remain aligned with said satellite, so that the user can automatically maintain communication with said satellite.

14. The system according to claim 1, wherein said synchronous satellites are in quasi-geosynchronous orbits.

15. A system for navigation which comprises:
a plurality of synchronous navigational satellites having means for transmitting a time signal comprising an identification code and navigation data to an intended user and to a plurality of ground transponder stations; and
a plurality of ground transponder stations having means for retransmitting the regenerated time signal and navigational data to said user.

16. The system according to claim 15, wherein said individual user is disposed in a vehicle and at least one of said ground stations includes means for sequentially interrogating said vehicle with the aid of data transmitted together with the navigational signal from a ground station directly or via one of said synchronous satellites, so as to prompt said vehicle to send out its position and identification code on a different carrier frequency, thereby effecting automatic monitoring.

17. A method for navigating using satellites for transmitting coded time signals as well as navigational data which comprises the steps of:
transmitting a time signal and navigational data from a synchronous satellite positioned in geosynchronous orbit to an intended user and to a plurality of ground transponder stations; and
retransmitting a time signal consisting of an identification code with said navigational data from said plurality of ground transponder stations directly to said users.

18. A system for navigation which comprises:
a plurality of orbiting navigational satellites having means for transmitting a time signal comprising an identification code to an intended user; and
a plurality of synchronous satellites having means for transmitting navigational data to said user and means for transmitting time signals on two different frequencies, for use in establishing a reference in time between the navigational satellite time signals and the synchronous satellite time signals.

* * * * *